(12) United States Patent
Yu et al.

(10) Patent No.: US 12,543,051 B2
(45) Date of Patent: Feb. 3, 2026

(54) DEVICE AND METHOD FOR CONTROLLING ANTENNA IN WIRELESS COMMUNICATION SYSTEM

(71) Applicant: Samsung Electronics Co., Ltd., Suwon-si (KR)

(72) Inventors: Seungpyo Yu, Suwon-si (KR); Seokin Shin, Suwon-si (KR); Seungwoo Shin, Suwon-si (KR); Dukki Yoon, Suwon-si (KR); Byeongryeon Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 147 days.

(21) Appl. No.: 18/329,877

(22) Filed: Jun. 6, 2023

(65) Prior Publication Data
US 2023/0319592 A1  Oct. 5, 2023

Related U.S. Application Data

(63) Continuation of application No. PCT/KR2021/018455, filed on Dec. 7, 2021.

(30) Foreign Application Priority Data

Dec. 9, 2020 (KR) .................. 10-2020-0171606

(51) Int. Cl.
*H04W 16/28* (2009.01)
*H04B 17/318* (2015.01)

(52) U.S. Cl.
CPC .......... *H04W 16/28* (2013.01); *H04B 17/328* (2023.05)

(58) Field of Classification Search
CPC .......... H04B 7/06; H04B 17/328; H01Q 1/00; H01Q 3/00; H01Q 21/00; H04W 16/28; H04W 24/02

(Continued)

(56) References Cited

U.S. PATENT DOCUMENTS 10,034,180 B2  7/2018 Hamalainen et al.
10,340,996 B1*  7/2019 Wakid .................. H04B 7/0639
(Continued)

FOREIGN PATENT DOCUMENTS

JP  H09326746 A  12/1997
JP  2012074889 A  4/2012
(Continued)

OTHER PUBLICATIONS

International Search Report for PCT/KR2021/018455 mailed Mar. 31, 2022, 5 pages.
(Continued)

*Primary Examiner* — Ricky Q Ngo
*Assistant Examiner* — Meheret Woldegebreal Kidane
(74) *Attorney, Agent, or Firm* — Nixon & Vanderhye, P.C.

(57) ABSTRACT

An example electronic device for controlling a base station antenna in a wireless communication system includes a communication unit; and at least one control unit electrically connected to the communication unit. The at least one control unit may be configured so as to acquire location information of another electronic device, determine a threshold value based on the location information, determine a radiation angle corresponding to the threshold value, transmit a steering instruction to a base station so as to control an antenna based on the radiation angle, and determine whether the steering of the antenna based on the radiation angle has been carried out or not.

14 Claims, 7 Drawing Sheets

(58) Field of Classification Search
USPC ........................................................ 370/329
See application file for complete search history.

(56) References Cited

U.S. PATENT DOCUMENTS

| | | | |
|---|---|---|---|
| 10,973,072 B2 | 4/2021 | Kang et al. | |
| 11,051,179 B2 | 6/2021 | Chang | |
| 11,189,908 B2 | 11/2021 | Fleischer et al. | |
| 2012/0129575 A1* | 5/2012 | Kenington | H04B 7/0617 |
| | | | 455/561 |
| 2013/0090128 A1* | 4/2013 | Sawamoto | H04W 16/18 |
| | | | 455/452.2 |
| 2014/0003365 A1* | 1/2014 | Carey | H04W 72/046 |
| | | | 370/329 |
| 2014/0192761 A1 | 7/2014 | Inoue et al. | |
| 2016/0021650 A1 | 1/2016 | Chembil-palat et al. | |
| 2017/0064618 A1* | 3/2017 | Katar | H04L 43/16 |
| 2020/0154285 A1 | 5/2020 | Sturgeon et al. | |

FOREIGN PATENT DOCUMENTS

| | | |
|---|---|---|
| JP | 2012175467 A | 9/2012 |
| JP | 2017085524 A | 5/2017 |
| KR | 100850888 B1 | 8/2008 |
| KR | 20090078608 A | 7/2009 |
| KR | 20120013109 A | 2/2012 |
| KR | 101494293 B1 | 2/2015 |
| KR | 101880707 B1 | 7/2018 |
| KR | 102001446 B1 | 7/2019 |
| KR | 102004127 B1 | 7/2019 |
| KR | 20190087870 A | 7/2019 |
| KR | 102067114 B1 | 1/2020 |

OTHER PUBLICATIONS

Written Opinion of the ISA for PCT/KR2021/018455 mailed Mar. 31, 2022, 5 pages.
Office Action dated Jul. 1, 2025 in Korean Application No. 10-2020-0171606 in English-language translation.

* cited by examiner

DEVICE AND METHOD FOR CONTROLLING ANTENNA IN WIRELESS COMMUNICATION SYSTEM

CROSS-REFERENCE TO RELATED APPLICATIONS

This application is a continuation of PCT/KR2021/018455, designating the United States, filed Dec. 7, 2021, in the Korean Intellectual Property Receiving Office, which is based on and claims priority to Korean Patent Application No. 10-2020-0171606, filed Dec. 9, 2020, in the Korean Intellectual Property Office. The contents of each of these applications are incorporated by reference herein in their entireties.

BACKGROUND

Field

The disclosure relates to a wireless communication system, for example, an electronic device or method of controlling an antenna.

Description of Related Art

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a "beyond 4G network" communication system or a "post long term evolution (post LTE)" system.

The 5G communication system is considered to be implemented in ultrahigh frequency (mmWave) bands (e.g., 60 GHz bands) so as to accomplish higher data rates. To decrease propagation loss of the radio waves and increase the transmission distance in the ultrahigh frequency bands, beamforming, massive multiple-input multiple-output (massive MIMO), full dimensional MIMO (FD-MIMO), array antenna, analog beam forming, large scale antenna techniques are discussed in 5G communication systems.

In addition, in 5G communication systems, development for system network improvement is under way based on advanced small cells, cloud radio access networks (cloud RANs), ultra-dense networks, device-to-device (D2D) communication, wireless backhaul, moving network, cooperative communication, coordinated multi-points (CoMP), reception-end interference cancellation and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

In a 5G system, a massive multiple-input multiple-output (massive MIMO) system that uses a large number of antennas for a transmitter and a receiver is considered as one of the important technologies playing a key role in a wireless communication system in the future, and research thereon is actively being conducted. In order to obtain a sufficient gain via a massive MIMO system, a base station may need channel state information (CSI). Accordingly, various research is being conducted to effectively obtain channel state information.

SUMMARY

Various example embodiments of the disclosure may provide a method and apparatus for efficiently controlling an antenna based on a distribution of user equipments (UEs) that access a base station in a wireless communication system.

An electronic device for controlling an antenna of a base station in a wireless communication system according to various embodiments of the disclosure may include a communication unit (including, e.g., a transceiver) and at least one controller (including, e.g., a processor) electrically connected to the communication unit, and the controller may be configured to obtain location information of another electronic device, determine a threshold value based on the location information, determine a radiation angle corresponding to the threshold value, and transmit a steering command to the base station so as to control the antenna based on the radiation angle.

A method and apparatus according to various example embodiments of the disclosure may efficiently control an antenna in a wireless communication system, and may increase an antenna coverage area and the intensity of a reception signal.

Advantageous effects obtainable from the disclosure are not limited to the above-mentioned effects, and other effects which are not mentioned may be clearly understood, through the following descriptions, by those skilled in the art to which the disclosure pertains.

BRIEF DESCRIPTION OF THE DRAWINGS

The above and/or other aspects of the disclosure will be more apparent by describing certain embodiments of the disclosure with reference to the accompanying drawings, in which.

DETAILED DESCRIPTION

Figure 1:
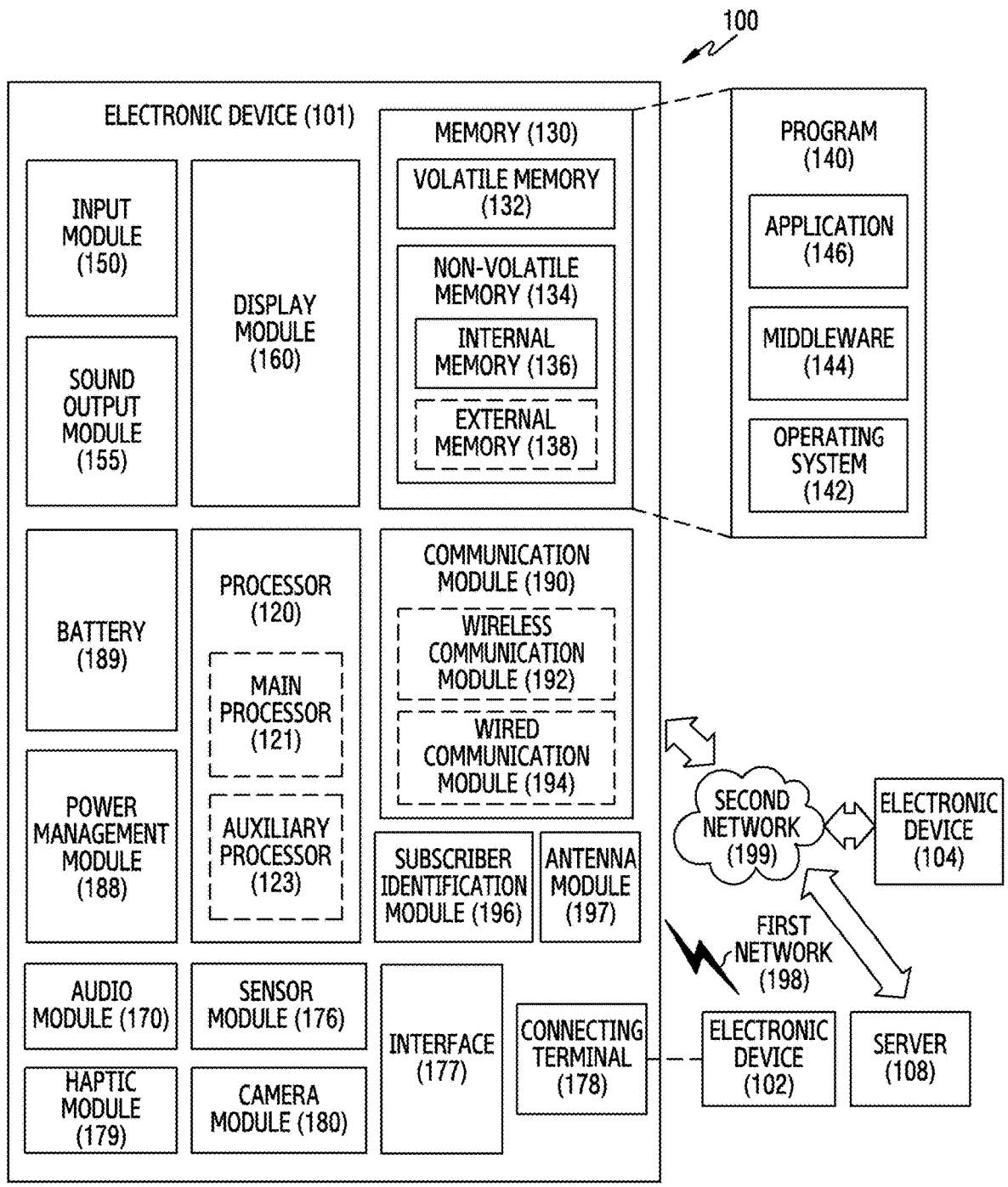
FIG. 1 is a block diagram of an example electronic device in a network environment according to various embodiments.

The terms used in the disclosure are only used to describe specific embodiments, and are not intended to limit the disclosure. A singular expression may include a plural expression unless they are definitely different in a context. Unless defined otherwise, all terms used herein, including technical and scientific terms, have the same meaning as those commonly understood by a person skilled in the art to which the disclosure pertains. Such terms as those defined in a generally used dictionary may be interpreted to have the meanings equal to the contextual meanings in the relevant field of art, and are not to be interpreted to have ideal or excessively formal meanings unless clearly defined in the disclosure. In various cases, even the term defined in the disclosure should not be interpreted to exclude embodiments of the disclosure.

Hereinafter, various example embodiments of the disclosure will be described based on an approach of hardware. However, various example embodiments of the disclosure include a technology that uses both hardware and software, and thus the various example embodiments of the disclosure do not exclude the perspective of software.

Hereinafter, described is a technique for decreasing latency that a user may feel by reducing a period of time spent in changing a communication network in a wireless communication system via a method and apparatus for changing a communication network based on a quality of communication between an electronic device and an access point in the wireless communication system.

In the following description, the terms "physical channel" and "signal" may, for example, be interchangeably used with the term "data" or "control signal". For example, a physical downlink shared channel (PDSCH) may, for example, refer to a physical channel over which data is transmitted, but the PDSCH may be used to refer to data. That is, in the disclosure, the expression "transmit a physical channel" may, for example, have the same meaning as "transmit data or a signal over a physical channel".

In the following description of the disclosure, higher signaling may, for example, refer to a signal transmission method in which a base station transmits a signal to an electronic device using a downlink data channel in a physical layer or an electronic device transmits a signal to a base station using an uplink data channel in a physical layer. The higher signaling may, for example, refer to radio resource control (RRC) signaling or a media access control (MAC) control element (CE).

As used in the disclosure, the expression "greater than" or "less than" may, for example, be used to determine whether a specific condition is satisfied or fulfilled, but this is intended only to illustrate an example and does not exclude "greater than or equal to" or "equal to or less than". A condition indicated by the expression "greater than or equal to" may be replaced with a condition indicated by "greater than", a condition indicated by the expression "equal to or less than" may be replaced with a condition indicated by "less than", and a condition indicated by "greater than and equal to or less than" may be replaced with a condition indicated by "greater than and less than".

In addition, various embodiments of the disclosure will be described using terms employed in some communication standards (e.g., the 3rd generation partnership project (3GPP)), but they are only for the sake of illustration. The embodiments of the disclosure may also be easily applied to other communication systems through modifications.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of, the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as a part of another component (e.g., the camera module 180 or the communication module 190) functionally related to the auxiliary processor 123. According to an embodiment, the auxiliary processor (e.g., a neural processing unit (NPU)) may include a hardware structure specific to processing of an artificial intelligence model. The artificial model may be generated through machine learning. For example, this learning may be performed by the electronic device 101 itself where artificial intelligence is executed, and may also be performed through a separate server (e.g., the server 108). A learning algorithm may include, for example, supervised learning, unsupervised learning, semi-supervised learning, or reinforcement learning, but is not limited to the above examples. The artificial intelligence model may include a plurality of artificial neural network layers. The artificial neural network may be one of a deep neural network (DNN), a convolutional neural network (CNN), a recurrent neural network (RNN), a restricted Boltzmann machine (RBM), a deep brief network (DBN), a bidirectional recurrent deep neural network (BRDNN), a deep Q-network, and a combination of two or more thereof, but is not limited to the above examples. Additionally or alternatively, the artificial intelligence model may include a software structure, in addition to the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of, the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a sensor circuit (e.g., a pressure sensor) adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

The connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his/her tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support 5G networks and next-generation communication technologies beyond 4G networks, for example, a new radio (NR) access technology. The NR access technology may support enhanced mobile broadband (eMBB), massive machine type communications (mMTC), or ultra-reliable and low-latency communications (URLLC). The wireless communication module 192 may support high-frequency bands (e.g., the mmWave band), for example, in order to achieve a high data transfer rate. The wireless communication module 192 may support various technologies for ensuring performance in high-frequency bands, such as beamforming, massive multiple-input and multiple-output (massive MIMO), full dimensional MIMO (FD-MIMO), array antenna, analog beam-forming, or large-scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of or including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on or adjacent to a first surface (e.g., the bottom surface) of the printed circuit board and capable of supporting a designated high-frequency band (e.g., the mmWave band), and a plurality of antennas (e.g., an array antenna) disposed on or adjacent to a second surface (e.g., the top or side surface) of the printed circuit board and capable of transmitting or receiving signals in the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultralow-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology. The electronic device 101 of FIG. 1 may relate to an electronic device in a wireless communication system according to various embodiments of the disclosure or other electronic devices.

Figure 2:
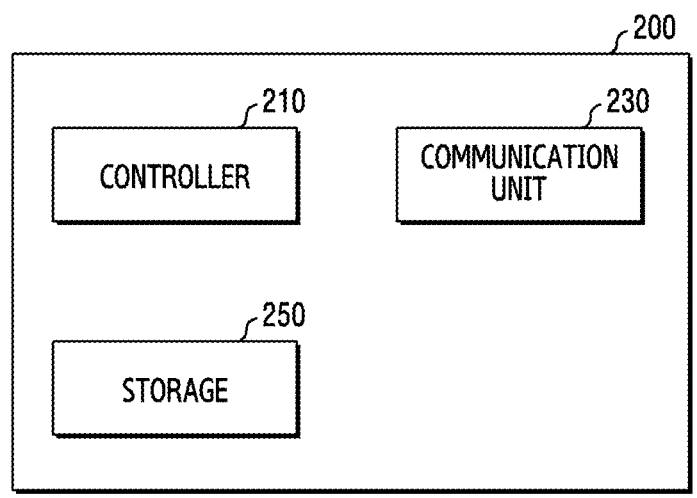
FIG. 2 is a diagram illustrating the configuration of an example electronic device in a wireless communication system according to various embodiments.

FIG. 2 is a diagram illustrating the configuration of an example electronic device in a wireless communication system according to various embodiments. The electronic device of FIG. 2 may be operatively connected to a base station and may be configured to perform signal or data transmission or reception with the base station. The electronic device of FIG. 2 may be construed as a concept that is different from another electronic device described later. The configuration of FIG. 2 may be understood as the configuration of an electronic device 200. The terms ' . . . unit' or ' . . . er' used hereinafter may refer to a unit of processing at least one function or operation, and the unit may be embodied as hardware, software, or a combination of hardware and software. The electronic device 101 of FIG. 1 and the electronic device 200 of FIG. 2 may perform the same or similar functions.

The electronic device may be a part of the configuration of a base station, or may be the base station itself. A controller included in the electronic device may perform a function same as or similar to that of a CPU included in at least one of a radio unit (RU), a digital unit (DU), and a massive multiple-input multiple-output unit (MMU) included in the base station.

The base station may include an RU and a DU, or may include an MMU and a DU. In this instance, the MMU may include a base station antenna unit. In a case in which the base station includes an RU and a DU, the RU may be operatively connected to a base station antenna, and may obtain and process information related to signal and data that the antenna receives.

A case in which the base station includes an MMU and a DU may be referred to, for example, as an MMU case.

In the MMU case, a controller that calculates an optimal radiation angle may be included in the MMU.

In this instance, the controller may be a component that is the same as or similar to a CPU of the MMU. The intensity of reception by a user equipment (UE) or location information of a user may be obtained and processed by the DU. The DU may collect the intensity of reception by the UE and the location information of the user and may transmit the collected information to the MMU.

Based on the information received from the DU, the CPU included in the MMU may determine an optimal radiation angle, and may adjust an antenna radiation angle via electric tilt control. The adjusted antenna radiation angle may be identified by a sensor included in an antenna, and may be transmitted to the MMU.

In the MMU case, the controller that calculates the optimal radiation angle may be included in the DU.

In this instance, the controller may be a component that is the same as or similar to a CPU of the DU. The intensity of reception by the UE or location information of the user may be obtained and processed by the DU.

Based on the obtained intensity of reception by a reception UE or user location information, the CPU included in the DU may determine an optimal radiation angle, and may transmit information related to the determined optimal radiation angle to the CPU included in the MMU. The CPU included in the MMU may adjust an antenna radiation angle based on the information related to the optimal radiation angle received from the DU, via electric tilt control. The adjusted antenna radiation angle may be identified by a sensor included in the antenna, and may be transmitted to the MMU.

The case in which the base station includes an RU and a DU may, for example, be referred to as an RRU case.

In the RRU case according to an embodiment, the controller that calculates an optimal radiation angle may be included in the RRU. In this instance, the controller may be a component that is the same as or similar to a CPU of the remote radio unit (RRU). The intensity of reception by the UE or location information of the user may be obtained and processed by the DU. The DU may collect the intensity of reception by the UE and the location information of the user and may transmit the collected information to the RRU.

Based on the information received from the DU, the CPU included in the RRU may determine an optimal radiation angle, and may adjust an antenna radiation angle via electric tilt control. The adjusted antenna radiation angle may be identified by a sensor included in the antenna, and may be transmitted to the RRU.

In the RRU case according to an embodiment, the controller that determines an optimal radiation angle may be included in the DU. In this instance, the controller may be a component that is the same as or similar to a CPU of the DU.

The intensity of reception by the UE or location information of the user may be obtained and processed by the DU. The DU may collect the intensity of reception by the UE and the location information of the user and may transmit the collected information to the RRU.

Based on the information received from the DU, the CPU included in the RRU may determine an optimal radiation angle, and may adjust an antenna radiation angle via electric tilt control. The adjusted antenna radiation angle may be identified by a sensor included in the antenna, and may be transmitted to the DU.

Specifically, a CPU included in the RRU or MMU controls an external tilt unit, whereby a process of adjusting the antenna radiation angle may be performed. The tilt unit may be operatively connected to the antenna unit and may control an antenna radiation angle based on an antenna control message received from the RRU or the MMU. In the control message received from the RRU or the MMU, information related to an optimal radiation angle may be included. The tilt unit may be referred to as a tilt device, a tilting unit, or the like.

The tilt unit may receive an antenna control message from a CPU included in the MMU or the RRU, and may perform control so that an antenna radiation angle has an optimal value. In this instance, an antenna may be electrically or physically controlled. The tilt unit may be electrically connected to the antenna unit, and may electrically control each of the antenna elements included in the antenna unit, thereby changing at least one of the power or phase of a transmission or reception signal. Alternatively, the tilt unit may mechanically control a physical angle formed by an antenna including an antenna unit. Here, it is construed that controlling a radiation angle includes both mechanical control and electric control. In the MMU case, in a case in which the antenna unit and the RU are coupled, the CPU included in the MMU may produce an antenna control message and may transmit the produced antenna control message to the tilt unit. In this instance, the tilt unit may perform tilting on the MMU itself based on the antenna control message received from the MMU.

Referring to FIG. 2, the electronic device 200 may include a controller 210 (e.g., the processor 120 of FIG. 1), a communication unit 230 (e.g., the communication module 190 of FIG. 1), a storage 250 (e.g., the memory 130 of FIG. 1), and/or a display (e.g., the display module 160 of FIG. 1) (not shown in FIG. 2). The communication unit 230 (including, e.g., a transceiver and/or other communication circuitry) may perform functions for transmitting and/or receiving a signal via a wireless channel. For example, the communication unit 230 may perform a function of conversion between a baseband signal and a bitstring according to a physical layer standard of a wireless communication system. For example, in a case of data transmission, the communication unit 230 may produce complex symbols by encoding and modulating a transmission bitstring. In addition, in a case of data reception, the communication unit 230 may restore a reception bitstring by demodulating and decoding a baseband signal. In addition, the communication unit 230 up-converts a baseband signal into an RF band signal and transmits the same via an antenna, and down-converts an RF band signal received via an antenna into a baseband signal. For example, the communication unit 230 may, for example, include a transmission filter, a reception filter, an amplifier, a mixer, an oscillator, a DAC (digital to analog convertor), and/or an ADC (analog to digital convertor).

In addition, the communication unit 230 may include a plurality of transmission/reception paths. In addition, the communication unit 230 may include at least one antenna array including a plurality of antenna elements. From the perspective of hardware, the communication unit 230 may include a digital circuit and an analog circuit (e.g., a radio frequency integrated circuit (RFIC)). Here, the digital circuit and the analog circuit may be embodied as a single package. In addition, the communication unit 230 may include a plurality of RF chains. In addition, the communication unit 230 may perform beamforming.

In addition, the communication unit 230 may include different communication modules for processing signals in different frequency bands. Furthermore, the communication unit 230 may include a plurality of communication modules to support a plurality of different radio access technologies. For example, the different radio access technologies may include Bluetooth low energy (BLE), wireless fidelity (Wi-Fi), WiFi gigabyte (WiGig), or a cellular network (e.g., long term evolution (LTE)). Further, the different frequency bands may include a super high frequency (SHF) (e.g., 2.5 GHz, 5 GHz, or 6 GHz) band and a millimeter (mm) wave (e.g., 60 GHz) band.

The communication unit 230 may transmit and receive signals as described above. Accordingly, the whole or a part of the communication unit 230 may, for example, be referred to as a 'transmitter', 'receiver' or 'transceiver'. In addition, transmission and reception performed via a wireless channel, which is described in the following descriptions, may be construed as an expression including that the above-described processing is performed by the communication unit 230.

The storage 250 may store data such as basic programs, application programs, configuration information, and the like for operation of the electronic device 200. The storage 250 may be embodied as volatile memory, non-volatile memory, or a combination of volatile memory and non-volatile memory. In addition, the storage 250 may provide data stored therein in response to a request from the controller 210.

The controller 210 (including, e.g., a processor and/or other controller circuitry) may control overall operations of the electronic device 200. For example, the controller 210 may perform signal transmission and reception via the communication unit 230. Further, the controller 210 may record data in the storage 250 and may read data therefrom. The controller 210 may perform the functions of a protocol stack that the communication standard requires. To this end, the controller 210 may include at least one processor or micro-processor, or may be a part of a processor. In addition, a part of the communication unit 230 and the controller 210 may be referred to as a communication processor (CP). According to various embodiments, the controller 210 may be included in a band sharing system, and may transmit a control command to each of the devices included in the band sharing system. Here, a control command may be a set of instructions or code stored in the storage 250, may be an instruction/code at least temporarily residing in the controller 210 or a storage space that stores an instruction/code, or may be a part of a circuit (circuitry) included in the controller 210.

The electronic device 200 may further include at least one component element illustrated in FIG. 1, in addition to the component elements illustrated in FIG. 2. For example, the electronic device 200 may further include a sensor unit. The sensor unit may provide, to the controller 210, sensor data (e.g., rotation data) related to the state of the electronic device 200.

The sensor unit may detect a physical signal in order to measure an antenna radiation angle of a base station. In a wireless communication system according to various embodiments of the disclosure, the electronic device may identify a radiation angle that an antenna of the base station forms based on a physical signal detected by the sensor unit.

Figure 3:
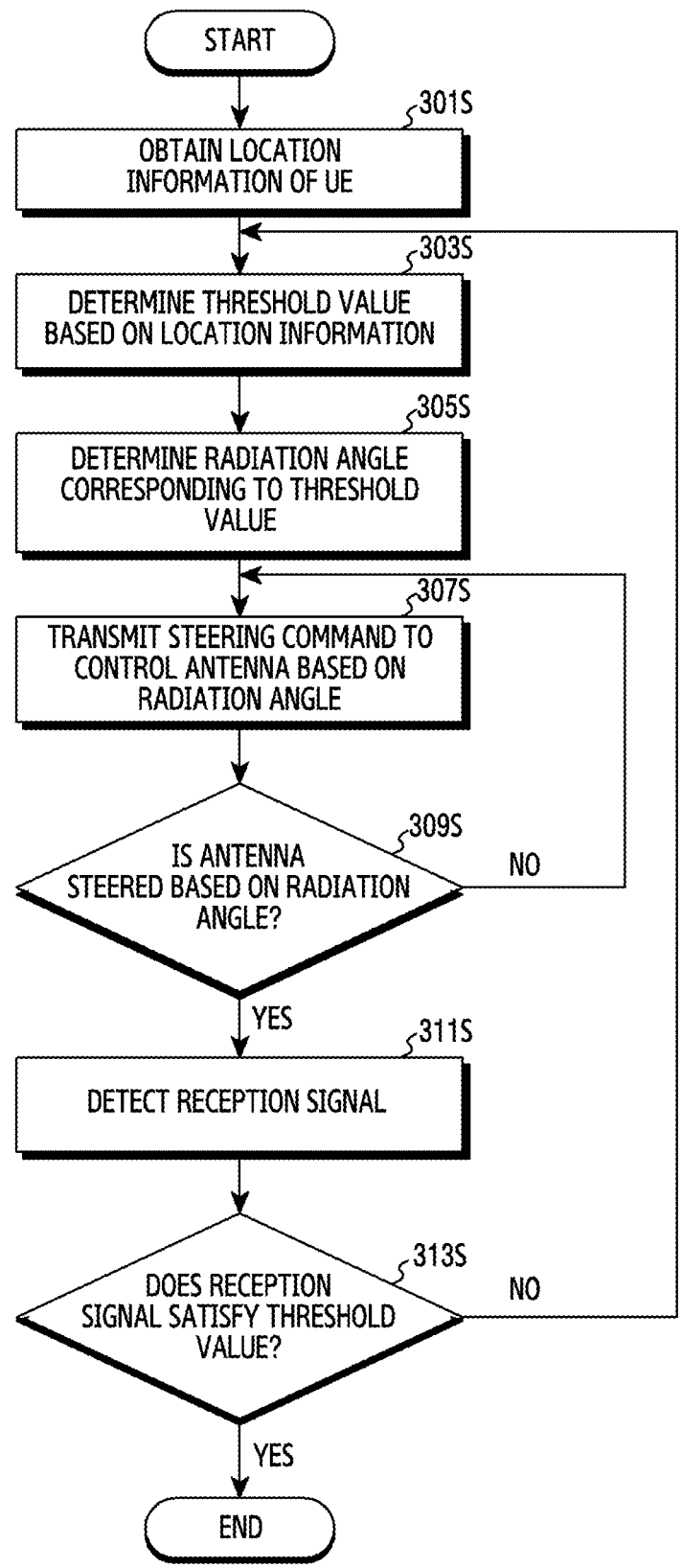
FIG. 3 is a flowchart illustrating an example operation of an example electronic device for controlling an antenna of a base station in a wireless communication system according to various embodiments.

FIG. 3 is a flowchart illustrating an example operation of an example electronic device for controlling an antenna of a base station in a wireless communication system according to various embodiments.

Referring to FIG. 3, in operation 301S, the electronic device may obtain location information of another electronic device.

As a method of recognizing the location of an electronic device, a method based on communication between a base station and another electronic device, a method based on a global positioning system (GPS), a method based on signal sensitivity of a Wi-Fi network, and the like may be used. Among them, the method based on communication between a base station and another electronic device may be a communication system used when a base station of a transmitter searches for a base station of a receiver. To implement the same, various known methods may be used. For example, in a case in which a UE transmits information to a base station, the UE may transmit location and distance information by including distance information in a feedback bit(s) agreed upon therebetween.

The electronic device may be operatively connected to the base station and may exchange signals or data with the base station. The electronic device may be electrically connected to control equipment or an antenna installed in the base station and may directly control the antenna and the like, or transmit a command for controlling the antenna or the like. The electronic device may operate as a part of the configuration of the base station. In this instance, operation of the electronic device may be understood as operation of the base station. The electronic device may be controlled independently from the base station and operate based on separate power, as opposed to being a part of the configuration of the base station. In this instance, the electronic device may transmit a control command or control message to the base station, so as to control transmission or reception equipment or control equipment such as an antenna included in the base station and the like.

Another electronic device may be a user equipment (UE) that communicates with the base station. Those skilled in the art may understand that a "UE" and a "terminal device" include a wireless signal receiver device that only has a wireless signal receiver excluding a capability of transmission, and also includes a device equipped with reception and transmission hardware that is a device having reception and transmission hardware capable of performing bidirectional communication via a bidirectional communication link. Such a device may include a cellular or another communication device having a single line display or a multi-line display or a cellular or another communication device excluding a multi-line display, a personal communication service (PCS) that may be a combination of voice and data processing, fax, and/or data communication function, a personal digital assistant (PDA) that may include a radio frequency (RF) receiver, a pager, an Internet/intranet access, a web browser, a node pad, a calendar, and/or a global positioning system (GPS) receiver, a normal laptop and/or palmtop computer or another device or a normal laptop or palmtop computer that may be another device including and/or having an RF receiver. A "terminal" and a "terminal device" used in the specification may, for example, be of a portable type, a transportable type, or an on-vehicle installation type (aircraft, ocean-going carrier, and/or land vehicle). Alternatively, they may be adapted and/or configured for locally operating and/or may distributively operate in the earth and/or another place in space. A "terminal" and the "terminal device" used in the specification may, for example, also include a communication terminal, an Internet terminal, a music/video reproduction terminal, for example, a PDA, a mobile Internet device (MID), and/or a mobile phone having a music/video reproduction function, or a smart TV, a set-top box, and other devices. In addition, the "UE" and the "terminal device" may be replaced with a "user" and a "UE".

At least one other electronic device may configure a wireless communication connection to the base station. Another electronic device may perform signal or data transmission or reception via the base station.

In a case that the electronic device is a part of the configuration of the base station, it is understood that another electronic device may configure a wireless communication connection to the electronic device. The electronic device may receive, process, or store a signal or data that the base station receives from the other electronic device. Although the electronic device is a separate entity that is independent from the base station, in a case that the electronic device is operatively connected to the base station and is capable of performing signal or data transmission or reception with the base station, the electronic device may be related to the other electronic device via the base station.

According to an embodiment, location information may be a relative distance to another electronic device. The relative distance may be the distance to the other electronic device in relation to the electronic device. The relative distance may be the distance to the other electronic device in relation to the base station. That is, the relative distance may be the distance between the base station and the other electronic device.

According to an embodiment, in a case that the electronic device is a part of the configuration of the base station, the electronic device may obtain information associated with the distance of how far another electronic device is away from the base station, the direction in association with the base station, and a relative velocity with respect to the base station in operation 301s.

According to an embodiment, the other electronic device may be at least one other electronic device. In a case that a plurality of other electronic devices is present, the location information of the other electronic devices may include information associated with the distance, direction, and velocity between the other electronic devices. In a case that a plurality of other electronic devices is present, the location information of each of the other electronic devices may include information associated with the distance, direction, and velocity between the base station and each of the other electronic devices.

According to an embodiment, in a case that a plurality of other electronic devices is present, the location information may include information associated with the size of an area in which the other electronic devices are present, information associated with the density of the plurality of other electronic devices, and the like. In an environment in which a plurality of other electronic devices is present, the location information associated with other electronic devices that the electronic device obtains may be expressed as location distribution information. The location distribution information may include information related to how far each of the plurality of other electronic devices is away from the base station and may also include information associated with how close the plurality of other electronic devices is located to one another. The information that the electronic device obtains in operation 301S may be identification information of the other electronic device, in addition to the location information of the other electronic device. In addition, the electronic device may obtain performance information of the other electronic device.

In operation 303S, the electronic device may determine a threshold value based on the obtained location information.

According to an embodiment, the location information may include the relative distance information of the other electronic device in relation to the electronic device. In a case that a plurality of other electronic devices is used, the location information may include relative distance information of each of the plurality of other electronic devices in relation to the electronic device. In a case that a plurality of other electronic devices is used, the location information may include relative distance information of other electronic devices remaining after excluding an arbitrary one other electronic device from the other electronic devices in relation to the arbitrary one electronic device. The location information may include relative distance information of other electronic devices, and may be determined based on a predetermined point.

According to an embodiment of the disclosure, the location information may include information related to the distance between a base station and a UE. In a case that a plurality of UEs is used, the location information may include information associated with the distance between the plurality of UEs. The location information may be a value determined based on information associated with the distance between a UE and a base station and the distance between the UE and another UE.

According to an embodiment of the disclosure, the location information may include information related to a distribution of a plurality of other electronic devices in an area in which the plurality of other electronic devices is present. The information related to the distribution of other electronic devices may be information related to density indicating how densely a plurality of other electronic devices is located in an area in which the plurality of other electronic devices is present. The information associated with density may be determined based on a physical quantity related to the area, size, scale, and the like of an area where other electronic devices are present, and information associated with the number of other electronic devices.

A threshold value may be determined based on information associated with the efficiency of a signal that an antenna receives. For example, in a case that the efficiency of reception of a signal is changed by changing the radiation angle of an antenna or the power or phase value of a reception beam in the situation in which the number of other electronic devices, location information, an environment that is a factor of interference, and the like are constant, it may be an arbitrary value among reception efficiencies to which the reception efficiency is capable of being changed.

The threshold value may be determined via selection by a user or may be a given value based on a command received from an external server. In addition, the threshold value may be a value updated based on a result value obtained as an electronic device operates.

According to an embodiment, the threshold value may be a value (e.g., an optimal value) that shows a maximum efficiency (or some efficiency greater than a predetermined efficiency) related to reception of a signal from another electronic device in the location of the other electronic device that is determined based on the obtained location information. In this instance, the optimal value, for example, may be a value adjustable by the side of the base station. For example, that may be a digitized value indicating a reception beam of a base station to be formed, the direction of an antenna to be configured, and the like. The optimal value may be selected based on data stored in advance. The optimal value may be a value configured by a user. The optimal value may differ depending on the performance of another electronic device, the state of a base station, and an external environment.

More particularly, the electronic device may determine a throughput of a reception signal based on a signal that the base station receives from another electronic device. In addition, the electronic device may determine the intensity of a reception signal based on a signal that the base station receives from another electronic device. The electronic device may measure the throughput or intensity of a reception signal, may digitize the same, and may compare the digitized value and a reference value stored in advance.

According to an embodiment, in a case that a value related to a signal that the base station receives from another electronic device is less than the reference value stored in advance, the electronic device may determine that the quality of the signal or a channel environment is poor. To improve a value related to a reception signal, the electronic device may transmit a control command to the base station so as to control variables that may be adjustable by the side of the base station. The variables that the side of the base station is capable of adjusting in order to improve a value related to a reception signal may, for example, include the direction of an antenna, formation of a transmission beam or reception beam of an antenna, and the like. The operation in which the electronic device determines a threshold value may be performed via at least one simulation.

Simulation may be implemented by configuring an algorithm for determining an optimal antenna radiation angle. Here, the algorithm may be about providing an optimal service by determining a direction in which a beam needs to be formed, wherein an antenna radiation angle is adjusted based on the distribution of user equipments (UE) in a base station cell and a CPU determines information (location, the amount of data) associated with UEs connected to a single base station so as to determine the direction of the beam.

In addition, in a case that an antenna radiation angle is corrected to a simulation result, a procedure of previously identifying whether a throughput (TP) of a user (UE) is to be increased may be further included.

Generally, in a case that a beam is adjusted to head in a direction in which users are intensively distributed, an increase of TP may be expected. In a case that the current radiation angle is an optimal angle, a TP may not be increased, and thus there is no need to adjust the radiation angle.

In operation 305S, the electronic device may determine a radiation angle corresponding to the determined threshold value.

According to an embodiment, the radiation angle may be a steering angle of the antenna included in the base station that is operatively connected to the electronic device. More specifically, the radiation angle may be a steering angle at which the antenna heads in order to receive a signal transmitted from another electronic device. The radiation angle may be referred to as an antenna angle. Determining an antenna angle may be controlling a direction in which the antenna heads in order to receive a signal from another electronic device. The antenna may be the antenna included in the base station. The electronic device may determine, based on data stored in advance, an antenna angle corresponding to an optimal value. For example, in a case that the optimal value has a significantly large difference from a value corresponding to the currently measured location information, it is determined to adjust the antenna angle by a large magnitude. In a case that the value corresponding to the currently measured location information is close to the optimal value, it is determined to minutely adjust the antenna angle.

According to an embodiment, adjusting an antenna angle may, for example, be referred to as an antenna tilting operation. The antenna tilting is adjusting the angle of an antenna electrically or mechanically in order to obtain an appropriate coverage area via the antenna or to minimize interference from a neighboring base station.

That may be an operation of enabling a main radiation direction on a vertical plane to have an inclination from a horizontal plane. The inclination may be a tilt, and an inclination angle may be referred to as a tilt angle. Here, the main radiation direction may be a direction in which the main lobe of a beam radiated from an antenna heads.

The antenna tilting operation may be divided as mechanical tilting and electric tilting.

The mechanical tilting may, for example, refer to tilting an antenna itself so that the main radiation direction of the antenna is inclined when viewed from the horizontal. In a case of implementing mechanical tilting, the base station antenna is connected to a motor that generates motive power for mechanical tilting, and the controller controls the motor connected to the base station antenna, thereby performing antenna tilting at a designated angle.

The electric tilting may, for example, refer to changing a main radiation direction by adjusting a feeding phase of an antenna end. The controller that is operatively connected to the antenna of the base station may control the power or phase angle of an antenna array for forming a transmission beam or reception beam of the antenna, thereby performing electric tilting.

In operation 307S, the electronic device may transmit a steering command so as to control the antenna based on the determined radiation angle.

According to an embodiment, the steering command may be transmitted to the base station that is operatively connected to the electronic device. An object to which the electronic device transmits the steering command may be the base station or external tilting equipment configured to control the antenna of the base station. In a case that the controller of the base station controls the antenna, the electronic device may transmit the steering command to the base station. The base station or the external tilting equipment may transmit a confirmation message to the electronic device in response to the received control command.

According to an embodiment, in a case that the electronic device is a part of the configuration of the base station, or is operatively connected to the base station and is capable of accessing the controller of the base station, the electronic device may directly control the antenna to have the determined antenna angle.

In operation 309S, the electronic device may detect whether the antenna is steered based on the radiation angle.

According to an embodiment, a sensor unit included in the electronic device may measure the angle of the antenna in response to transmission of the steering command. The sensor unit may measure, based on a physical signal, the antenna angle changed according to the steering command. The sensor may be any type of known measurement devices capable of measuring the direction or angle of an antenna. The sensor may measure the current angle of the antenna based on an image or image information. In a case that the electronic device measures the angle of the antenna, the electronic device may compare the measured antenna angle and information associated with a desired antenna angle included in the steering command. In a case that the antenna angle measured by the electronic device using the sensor is equal to an antenna angle desired to be steered or falls within an error range, the electronic device may determine that antenna control based on the steering command is completed. In a case that the electronic device determines that the antenna control based on the steering command is completed, the electronic device may proceed with operation 311S. In a case that the electronic device determines that the antenna control based on the steering command is not completed, the electronic device may proceed again with operation 307S.

In operation 311S, the electronic device may detect a reception signal from the other electronic device.

According to an embodiment, the detected reception signal may be information related to a reception signal. The information related to a reception signal may include information related to the throughput, intensity, and the like of a signal that the electronic device receives from the other electronic device. In a case of detecting the information related to a reception signal from the other electronic device, the electronic device may perform detection based on a signal received at the antenna angle changed according to the steering command.

In operation 313S, the electronic device may determine whether the detected reception signal satisfies the threshold value.

According to an embodiment, the electronic device may determine whether a digitized value related to the intensity or the throughput of a signal received from the other electronic device satisfies the threshold value determined based on the location information. To satisfy the threshold value may indicate that a value obtained based on the information related to a reception signal is determined as being greater than or equal to a value corresponding to the threshold value.

According to an embodiment, in a case that an optimal antenna direction in which the base station is capable of receiving a signal from the other electronic device at the maximum intensity is determined based on the given data associated with the location, distribution, distance, direction, speed, or the like of the other electronic device, the threshold value determined based on the location information may be a value related to the throughput of a reception signal or the maximum intensity of a reception signal capable of being measured in the optimal antenna direction.

Therefore, in a case that the antenna of the base station is configured to head in the optimal antenna direction, the electronic device may determine whether the throughput or intensity of a signal that the antenna receives from the other electronic device satisfies the threshold value.

According to an embodiment, if the information related to the reception signal satisfies the threshold value, the electronic device may determine that steering of the base station antenna is optimally performed.

In a case that the information related to a reception signal does not satisfy the threshold value, the electronic device may proceed again with operation 303S. In this instance, the electronic device may determine a threshold value based on the information related to a reception signal detected in operation 311S.

In operation 307S, the electronic device may transmit the steering command again.

According to an embodiment, in a case that antenna control based on the steering command is determined as not being completed, the electronic device may transmit the same steering command again. For example, in a case that a message indicating changing of the antenna angle of the base station to 45 degrees is included in the steering command, the sensor may measure, based on a physical signal, whether the antenna angle is changed to 45 degrees. However, in a case that the antenna angle that the sensor measures is 42 degrees (different from 45 degrees), the electronic device may determine that antenna control based on the steering command is not completed, and may transmit the steering command including the message indicating 'changing of the steering angle of the antenna to 45 degrees' again. In a case that the steering angle of the antenna that the sensor measures is 45 degrees, the electronic device may determine that steering of the antenna of the base station according to the steering command is completed. However, in a case that a result obtained by measuring the information related to a reception signal based on a signal received from the other electronic device is less than the threshold value, it is determined that an antenna angle changed according to the steering command is not an optimal angle. In this instance, it is considered that a desired antenna angle include in an initial steering command is erroneous. Therefore, the electronic device may determine again an optimal value based on the location information of the other electronic device. In addition, even in a case that the location of the other electronic device is changed due to movement during simulation, a similar operation may be performed.

In a case that the information related to a reception signal does not satisfy the threshold value, the electronic device may determine a threshold value based on the location information obtained in operation 303S.

In a case that the detected reception signal does not satisfy the threshold value although the antenna radiation angle is normally controlled according to the control command transmitted by the electronic device, it shows that the threshold value configured first is not an optimal value. Therefore, the electronic device returns to operation 303S, and may configure a threshold value again.

In this instance, the threshold value may be determined based on the information related to a reception signal detected in operation 311S and the location information of the other electronic device obtained in operation 301S. In this instance, the determined threshold value may, for example, be referred to as a secondary threshold value. In this instance, the threshold value determined first may, for example, be referred to as a primary threshold value.

In a case that the information related to a reception signal does not satisfy the determined threshold value in operation 313S, an operation of returning to operation 303S may be repeatedly performed. In this instance, the determined threshold value may be a most recently determined threshold value.

Figure 4:
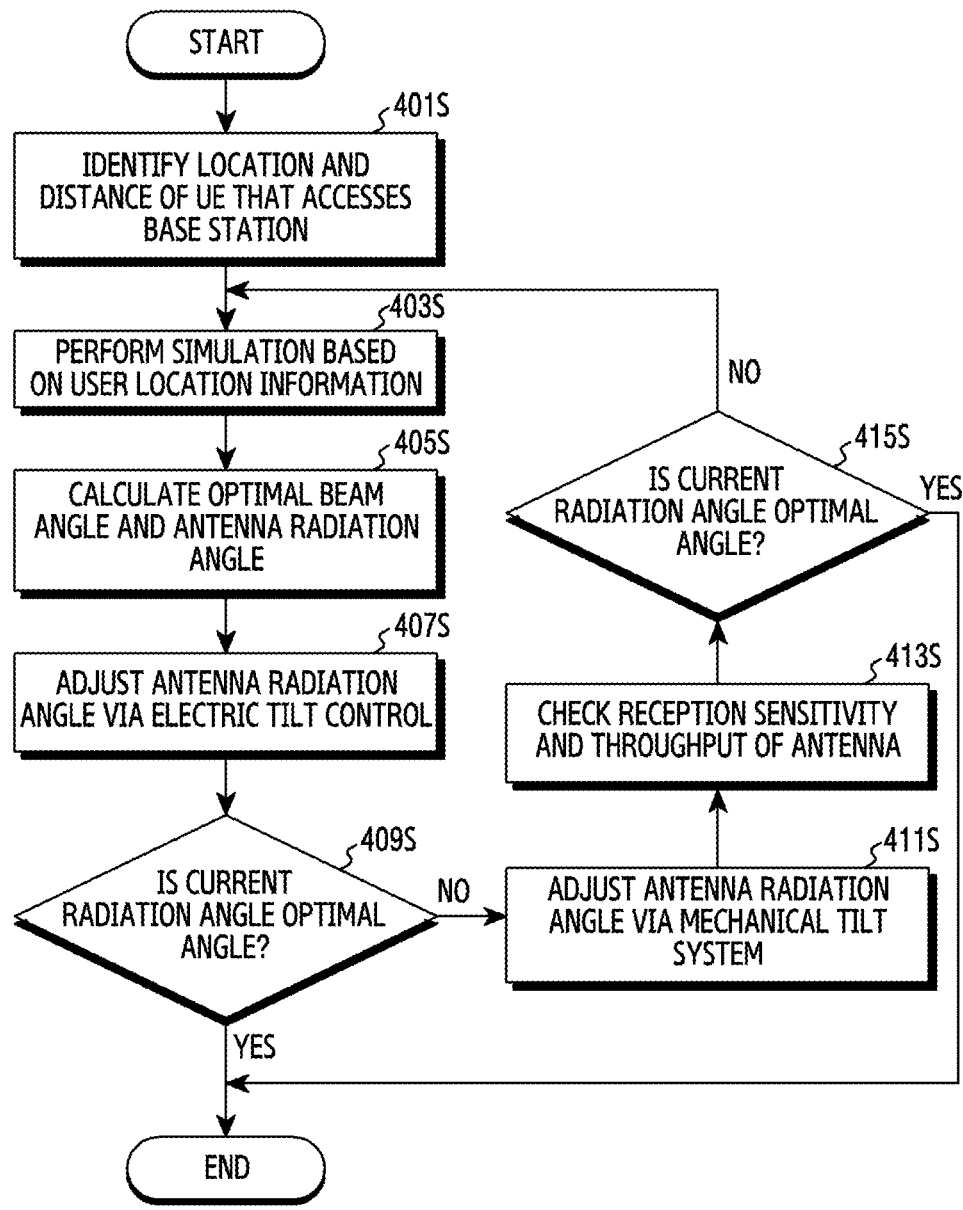
FIG. 4 is a flowchart illustrating an example operation of an example electronic device for controlling an antenna of a base station in a wireless communication system according to various embodiments.

FIG. 4 is a flowchart illustrating an example operation of an example electronic device for controlling an antenna of a base station in a wireless communication system according to various embodiments. Operations of FIG. 4 may be detailed operations of the operations of FIG. 3, or may, for example, be an embodiment different from FIG. 3.

Referring to FIG. 4, in operation 401S, an electronic device may identify the location and distance of a user that accesses a base station.

The user that accesses the base station may be a user who carries another electronic device. The other electronic device may, for example, be a UE that is in a state of having a wireless communication connection to the base station that is operatively connected to the electronic device.

The location of the user may be an absolute location where the other electronic device is present at a point in time at which operation 401S is performed. The distance of the user may be a separation distance between the other electronic device and the electronic device or the base station operatively connected to the electronic device.

In operation 403S, the electronic device may perform simulation based on the location information of the user.

The location information of the user may be user location and distance information identified in operation 401S. The simulation is to obtain data based on given information according to a predetermined rule. The electronic device may perform simulation in order to obtain a predetermined value based on each of the variables identifiable in a situation in which a plurality of users is present or the location information of a user is variable.

In operation 405S, the electronic device may calculate a beam angle (e.g., an optimal beam angle) and an antenna radiation angle (e.g., an optimal antenna radiation angle).

The calculation in operation 405S may be performed based on the simulation performed in operation 403S. Therefore, the optimal beam angle and the optimal antenna radiation angle may be calculated based on the location information of the user. The optimal beam angle may be an angle at which the base station forms an optimal beam to perform signal or data transmission or reception with the other electronic device carried by the user. The optimal angle may be a beam angle at which the base station is capable of most efficiently transmitting or receiving a signal or data. The radiation angle may be an angle that the antenna forms physically. The optimal antenna radiation angle may be a physical steering angle of the antenna at which the base station is capable of most efficiently transmitting or receiving a signal or data to the other electronic device carried by the user. The optimal beam angle and the optimal antenna radiation angle may be calculated based on the location information of the user and simulation according to a predetermined rule.

In operation 407S, the electronic device may adjust the antenna radiation angle via electric tilt control.

The electronic device may adjust the antenna radiation angle based on the antenna radiation angle calculated in operation 405S. The electric control may control the antenna radiation angle by configuring an electric signal. In addition, that may be configuring the angle of a reception beam to be different in an electric manner.

In operation 409S, the electronic device may identify whether the current radiation angle is an optimal angle.

The current radiation angle may be an antenna radiation angle changed by adjusting an antenna radiation angle in operation 407S. Therefore, the electronic device may analyze the reception sensitivity of an antenna using a signal that the antenna receives at the changed antenna radiation angle, and may identify whether the changed antenna radiation angle is an optimal radiation angle.

Via a sensor included in antenna equipment, an angle that the antenna forms may be detected. In a case that the detected angle is identical to the optimal antenna radiation angle or falls within an error range, the electronic device may identify signal reception sensitivity based on location information obtained from a plurality of other electronic devices.

In a case that the current radiation angle is determined as the optimal radiation angle, the electronic device may maintain the current state and may terminate the procedure.

In a case that the current radiation angle is determined as not being the optimal radiation angle, the electronic device may proceed with operation 411S.

In operation 411S, the electronic device may adjust the antenna radiation angle via a mechanical tilt system. The mechanical tilt system may be direct control of the physical angle and location of an antenna.

In operation 413S, the electronic device may check the reception sensitivity of an antenna and may identify a throughput.

According to an embodiment, in a case that the antenna of the base station receives a signal from the other electronic device carried by the user, the reception sensitivity and throughput of the antenna may be the sensitivity and throughput of the received signal. To identify the reception sensitivity and the throughput of the antenna may, for example, refer to a process of identifying whether the reception sensitivity and the throughput of the antenna identified by the electronic device is less than or equal to a threshold value.

In operation 415S, the electronic device may identify whether the current radiation angle is an optimal angle.

The process in which the electronic device identifies whether the current radiation angle is an optimal angle may detect an angle formed by the antenna using a sensor included in the electronic device. In a case that the detected angle is identical to the optimal antenna radiation angle or falls within an error range, the electronic device may perform the process by identifying signal reception sensitivity based on location information obtained from a plurality of other electronic devices, and based on the throughput.

In a case that the identified reception sensitivity and throughput of the antenna are greater than or equal to threshold values, the electronic device may determine that the current radiation angle is an optimal angle. The threshold value may be determined in advance by the user, or may be a value input from the outside.

According to an embodiment, the current radiation angle may be an antenna radiation angle that has been adjusted by electric tilting or mechanical tilting. In a case that the current radiation angle is determined as an optimal angle, the electronic device may maintain the current state and may terminate the procedure.

In a case that the current radiation angle is determined as not an optimal angle, the electronic device may return to operation 403S and may perform previous operations again.

According to an embodiment, after the procedure is terminated, the electronic device may start again from the beginning. The electronic device may return to the beginning according to an operation cycle configured by an operator. By taking into consideration the location of another electronic device is changed as a user moves in real time, the electronic device may need to periodically control an antenna radiation angle. Therefore, even after calculating an optimal radiation angle and adjusting an antenna radiation angle, the electronic device may repeatedly perform an antenna steering operation in predetermined cycles. In this instance, the repetition cycle may be based on a value configured in advance by an operator.

Figure 5:
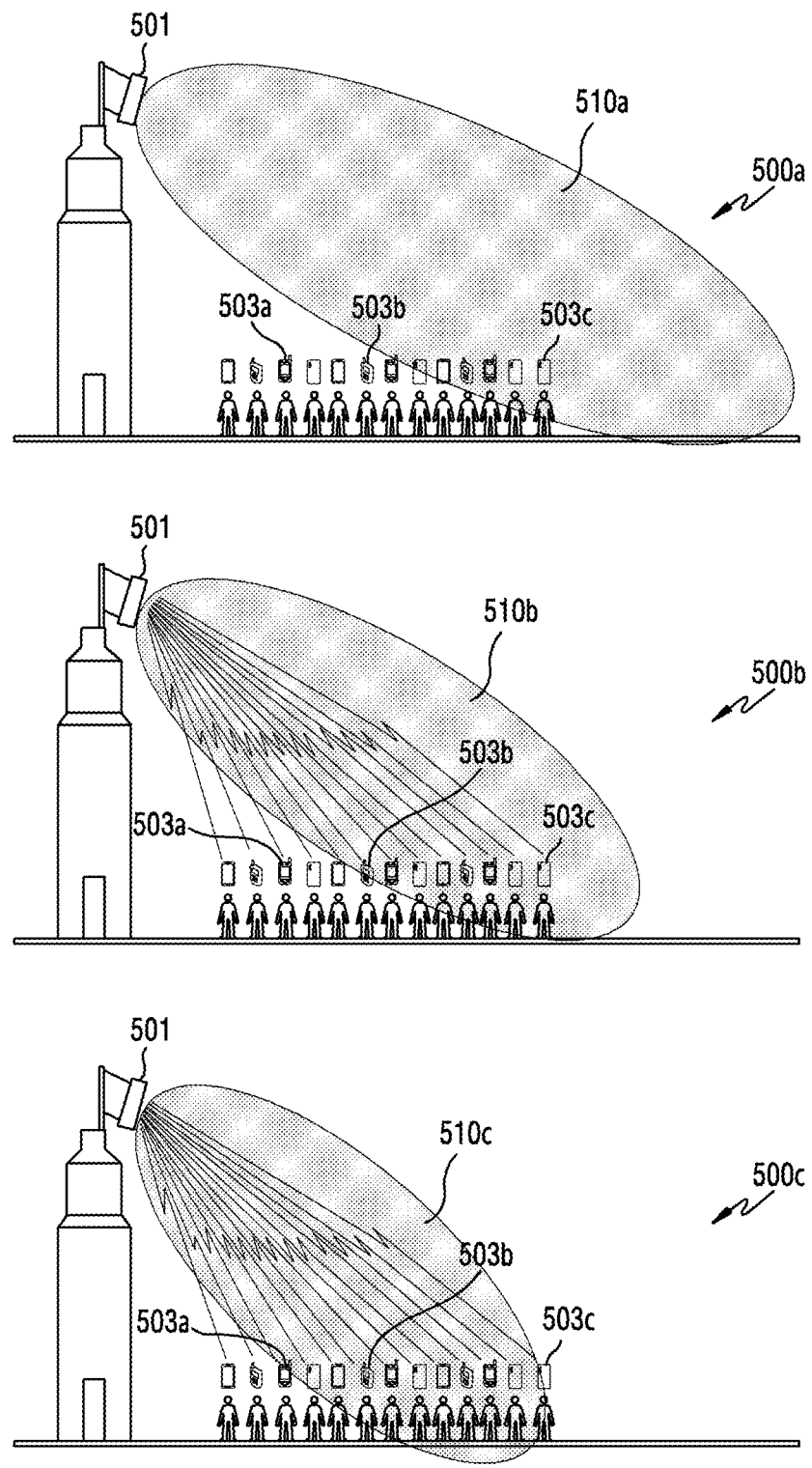
FIG. 5 is a diagram illustrating an example operation of an example electronic device for controlling an antenna of a base station in the vertical direction in a wireless communication system according to various embodiments.

FIG. 5 is a diagram illustrating an example operation of an example electronic device for controlling an antenna of a base station in the vertical direction in a wireless communication system according to various embodiments.

Referring to FIG. 5, a wireless communication system of the disclosure may include a base station antenna 501 and user equipments (UEs) 503a, 503b, and 503c.

According to an embodiment, a base station antenna may be a part of the configuration of a base station, and may be controlled by the electronic device or may be operatively connected to the electronic device. A UE has a wireless communication connection to the base station, and may, for example, be referred to as another electronic device.

Referring to FIG. 5, a first environment 500a illustrates an environment given before antenna radiation angle control by an electronic device is performed. A second environment 500b illustrates an environment in which antenna radiation angle control by the electronic device is being performed. A third environment 500c illustrates an environment in which antenna radiation angle control by the electronic device is completed.

In the first environment, the base station antenna forms a coverage area in a place different from an area where other electronic devices are crowded, and thus a signal reception efficiency is expected to be low. In the second environment, via the base station antenna, the electronic device may obtain location information of a plurality of other electronic devices and may perform an operation for tilting an antenna radiation angle based on the obtained location information. Via the operation of tilting the antenna radiation angle, the coverage area formed by the base station may be moved to an area where a plurality of other electronic devices is crowded. In a case that the coverage area formed by the base station covers an area where a plurality of other electronic devices are most densely crowded in the third environment, tilting the radiation angle of the base station antenna may be completed. The process of tilting the radiation angle of the antenna from the first environment to the third environment may be referred to as a down-tilting operation. The antenna of the base station may perform the down-tilting operation by lowering a heading angle of the antenna down.

FIG. 5 illustrates a case in which a plurality of UEs are present. The UEs may, for example, be classified as a first UE 503a, a second UE 503b, and a third UE 503c depending on a direction and a distance from the base station antenna.

A coverage area 510a, 510b, and 510c may be defined based on the direction in which the base station antenna heads. A UE that is present in a determined coverage area may efficiently perform signal transmission or reception with the base station. In this instance, in an environment in which a plurality of UEs are present, a UE that is located beyond the determined coverage area may have low quality of communication with the base station, which is a drawback.

According to an embodiment, the coverage area may be defined as the first coverage area 510a, the second coverage area 510b, and the third coverage area 510c depending on the direction of the base station antenna.

In an environment in which the base station forms the first coverage area, the first UE and the second UE are located beyond the first coverage area, and thus efficient wireless communication with the base station may be difficult. Conversely, the third UE is present in the first coverage area, and thus may have an efficient wireless communication connection to the base station.

According to a steering command from the electronic device, a radiation angle of the base station antenna may be adjusted to form the second coverage area.

In an environment in which the base station forms the second coverage area, the first UE is located beyond the second coverage area, and thus efficient wireless communication with the base station may be difficult. Conversely, the second UE and the third UE are present in the second coverage area, and thus may have efficient wireless communication connections to the base station.

According to an additional steering command from the electronic device, a radiation angle of the base station antenna may be adjusted to form the third coverage area.

In an environment in which the base station forms the third coverage area, all of the first UE, the second UE, and the third UE are present in the third coverage area, and thus may have efficient wireless communication connections to the base station.

According to an embodiment, to change the coverage area formed by the base station antenna from the first coverage area to the third coverage area may be performed via vertical tilting of the base station antenna. In an environment in which a plurality of UEs is present, the electronic device may adjust the base station antenna in the top-to-bottom direction to form a coverage area including a UE located close to the base station.

Figure 6:
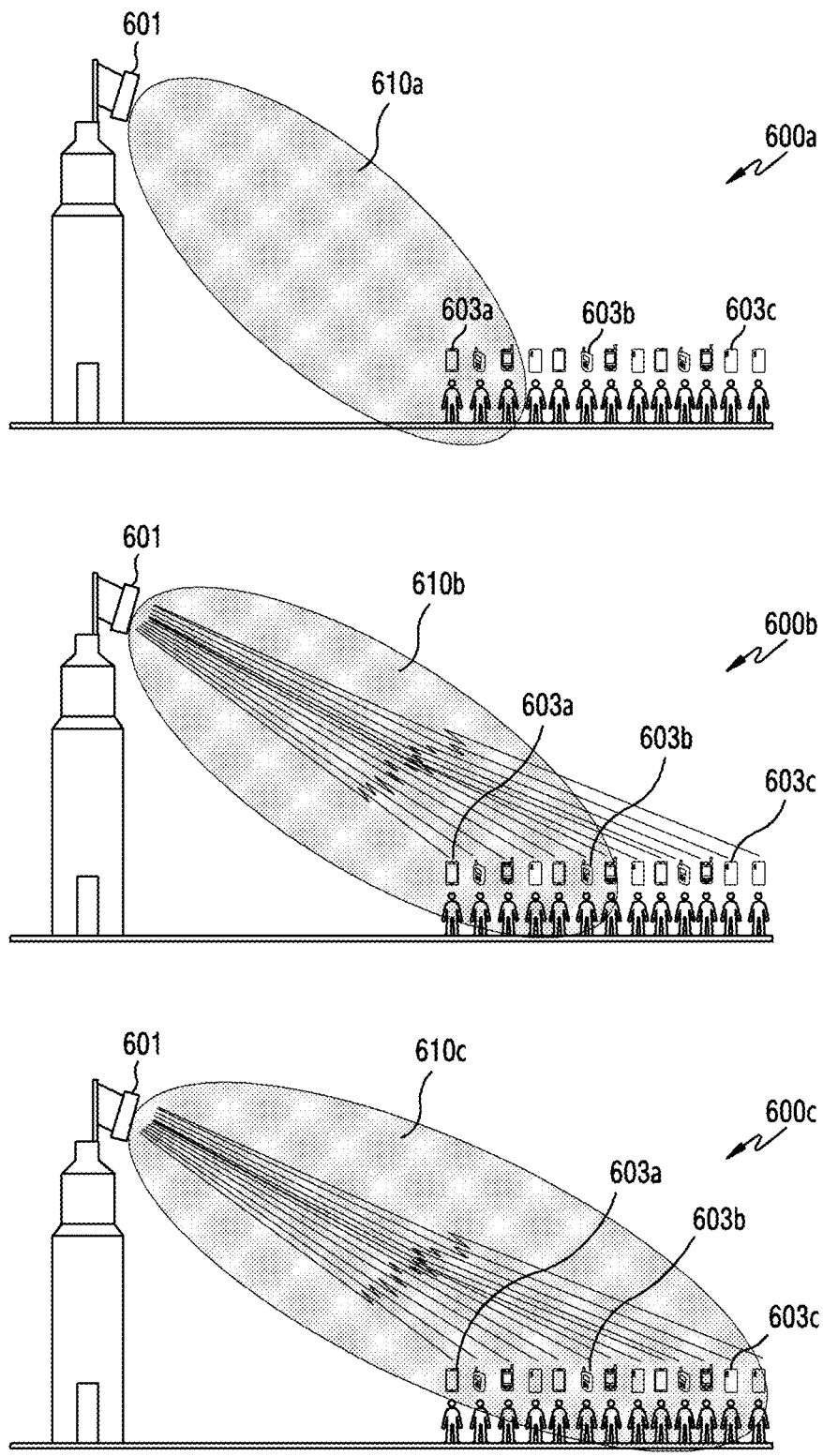
FIG. 6 is a diagram illustrating an example operation of an example electronic device for controlling an antenna of a base station in the vertical direction in a wireless communication system according to various embodiments.

FIG. 6 is a diagram illustrating an example operation of an example electronic device for controlling a base station antenna in the vertical direction in a wireless communication system according to various embodiments.

Referring to FIG. 6, a fourth environment 600a illustrates an environment given before antenna radiation angle control by an electronic device is performed. A fifth environment 600b illustrates an environment in which antenna radiation angle control by the electronic device is being performed. A sixth environment 600c illustrates an environment in which antenna radiation angle control by an electronic device is completed.

In the fourth environment, the base station antenna forms a coverage area in a place different from an area where other electronic devices are crowded, and thus a signal reception efficiency is expected to be low. In the fifth environment, via the base station antenna, the electronic device may obtain location information of a plurality of other electronic devices and may perform an operation for tilting an antenna radiation angle based on the obtained location information. Via the operation of tilting the antenna radiation angle, the coverage area formed by a base station may be moved to an area where a plurality of other electronic devices are crowded. In the sixth environment, in a case that the coverage area formed by the base station covers an area where a plurality of other electronic devices are most densely crowded, the operation of tilting the radiation angle of the base station antenna may be completed.

According to an embodiment, the process of tilting the radiation angle of the antenna from the fourth environment to the sixth environment may be referred to an up-tilting operation. The base station antenna may perform the up-tilting operation by raising a heading angle of the antenna up.

Referring to FIG. 6, a wireless communication system of the disclosure may include a base station antenna 601 and user equipments (UEs) 603a, 603b, and 603c.

The UEs may, for example, be classified as a fourth UE 603a, a fifth UE 603b, and a sixth UE 603c depending on a direction and a distance from the base station antenna.

A coverage area 610a, 610b, and 610c may be defined based on the direction in which the base station antenna heads. A UE that is present in a determined coverage area may efficiently perform signal transmission or reception with the base station.

According to an embodiment, the coverage area may, for example, be defined as a fourth coverage area 610a, a fifth coverage area 610b, and a sixth coverage area 610c based on the direction of the base station antenna.

In an environment in which the base station forms the fourth coverage area, the fifth UE and the sixth UE are located beyond the fourth coverage area, and thus efficient wireless communication with the base station may be difficult. Conversely, the fourth UE is present in the fourth coverage area, and thus may have an efficient wireless communication connection to the base station.

According to a steering command from the electronic device, a radiation angle of the base station antenna may be adjusted to form the fifth coverage area.

In an environment in which the base station forms the fifth coverage area, the sixth UE is located beyond the fifth coverage area, and thus efficient wireless communication with the base station may be difficult. Conversely, the fourth UE and the fifth UE are present in the fifth coverage area, and thus may have efficient wireless communication connections to the base station.

According to an additional steering command from the electronic device, the radiation angle of the base station antenna may be adjusted to form the sixth coverage area.

In an environment in which the base station forms the sixth coverage area, all of the fourth UE, the fifth UE, and the sixth UE are present in the sixth coverage area, and thus may have efficient wireless communication connections to the base station.

According to an embodiment, to change the coverage area formed by the antenna of the base station from the fourth coverage area to the sixth coverage area may be performed via vertical tilting of the base station antenna. In an environment in which a plurality of UEs is present, the electronic device may adjust the base station antenna in the bottom-to-top direction to form a coverage area including a UE located close to the base station.

According to an embodiment, the operation of changing the coverage area by controlling the radiation angle of the base station antenna may be included in the operations performed by the electronic device in FIG. 3. The electronic device may determine a threshold value based on location information obtained from a plurality of other electronic devices, and may obtain an optimal antenna radiation angle corresponding to the determined threshold value. The electronic device may transmit an antenna radiation control command based on the obtained optimal antenna radiation angle. In order to identify whether the base station antenna is controlled according to the optimal antenna radiation angle, the angle formed by the base station antenna may be detected via a sensor included in the electronic device. In a case that the detected angle and the optimal antenna radiation angle are identical or falls within an error range, the electronic device may identify signal reception sensitivity based on the location information obtained from the plurality of other electronic devices. In a case that a reception efficiency determined based on the signal reception sensitivity corresponds to the determined threshold value, the electronic device may terminate the antenna control operation. In a case that the reception efficiency determined based on the signal reception sensitivity is less than the determined threshold value, the electronic device may determine a threshold value again based on location information obtained last, may obtain an antenna radiation angle corresponding to the threshold value, and may repeat the control operation.

Figure 7:
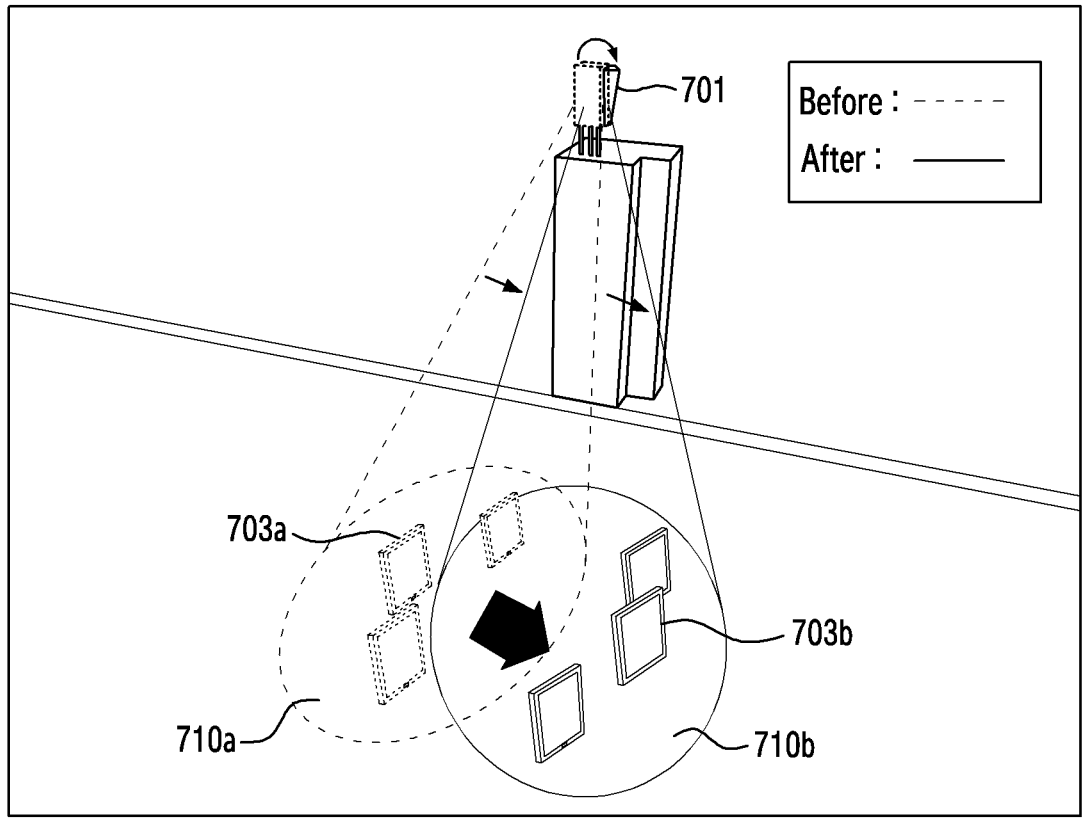
FIG. 7 is a diagram illustrating an example operation of an example electronic device for controlling an antenna of a base station in the horizontal direction in a wireless communication system according to various embodiments.

FIG. 7 is a diagram illustrating an example operation of an example electronic device for controlling a base station antenna in the horizontal direction in a wireless communication system according to various embodiments.

Referring to FIG. 7, a wireless communication system of the disclosure may include a base station antenna 701 and a user equipment (UE) 703a and 703b.

According to an embodiment, a coverage area 710a and 710b may be defined based on a direction in which a base station antenna heads. A UE that is present in a determined coverage area may efficiently perform signal transmission or reception with a base station. In this instance, in an environment in which a plurality of UEs are present, a UE that is located beyond the determined coverage area may have low quality of communication with the base station, which is a drawback.

FIG. 7 illustrates an example operation in which an example electronic device controls the radiation angle of a base station antenna in a case that location information obtained from a plurality of UEs is variable. In a case that the UE 703a that has a wireless communication connection to a base station moves from the left to the right from the perspective of the base station, the UE 703a may leave a seventh coverage area 710a formed by the base station due to a movement. The quality of wireless communication between the base station and the UE that is located beyond the coverage area may deteriorate, and may cause communication disruption.

According to an embodiment, the electronic device may transmit a steering command to the base station or equipment that controls the base station antenna, so as to control the radiation angle of the antenna from the left to the right. Via control of the radiation angle, the coverage area formed by the base station antenna may be changed from the seventh coverage to an eighth coverage. The eighth coverage area corresponds to an area where the UE is currently present after movement, and the UE may perform efficient wireless communication with the base station via the movement to the coverage area.

According to an embodiment, in a case that the UE 703b that has a wireless communication connection to the base station moves from the right to the left from the perspective of the base station, the movement may make the UE 703b leave the eighth coverage 710b formed by the base station. The quality of wireless communication between the base station and the UE that is located beyond the coverage area may deteriorate, and may cause communication disruption.

According to an embodiment, the electronic device may transmit a steering command to the base station or equipment that controls the base station antenna, so as to control the radiation angle of the antenna from the right to the left. Via control of the radiation angle, the coverage area formed by the base station antenna may be changed from the eighth coverage area to the seventh coverage area. The eighth coverage corresponds to an area where the UE is currently present after movement, and the UE may perform efficient wireless communication with the base station via the movement to the coverage area.

An electronic device for controlling an antenna of a base station in a wireless communication system according to various example embodiments of the disclosure may include a communication unit and at least one controller (at least one processor) electrically connected to the communication unit, and the at least one controller is configured to obtain location information of another electronic device, determine a threshold value based on the location information, determine a radiation angle that corresponds to the threshold value, and transmit a steering command to a tilt device associated with the base station so as to control the antenna based on the radiation angle.

According to an example embodiment, the at least one controller may be further configured to determine whether the antenna is steered based on the radiation angle, detect a reception signal from the other electronic device in response to determining that the antenna is steered based on the radiation angle, and determine whether the reception signal satisfies a threshold value.

According to an example embodiment, the at least one controller may be further configured to determine whether the antenna is steered based on the radiation angle, and transmit a steering command again so as to control the antenna based on the radiation angle in response to determining that the antenna is not steered based on the radiation angle.

According to an example embodiment, in response to determining that the reception signal does not satisfy the threshold value, the at least one controller may be further configured to determine a threshold value again based on the location information.

According to an example embodiment, the reception signal may be the sensitivity or throughput of a signal received from the other electronic device.

According to an example embodiment, in response to determining that the reception signal satisfies the threshold value, the at least one controller may be further configured to obtain location information of the other electronic device again.

According to an example embodiment, the location information may include information associated with the distribution of at least one other electronic device, wherein the distribution of the at least one other electronic device may include information associated with a density of the at least one other electronic device and a distance between the at least one other electronic device.

According to an example embodiment, the at least one controller may be further configured to receive a physical signal, and determine, based on the physical signal, whether the antenna is steered based on the radiation angle.

According to various example embodiments of the disclosure, an operation method of an electronic device for controlling an antenna of a base station in a wireless communication system may include obtaining location information of another electronic device, determining a threshold value based on the location information, determining a radiation angle that corresponds to the threshold value, and transmitting a steering command to the base station so as to control the antenna based on the radiation angle.

According to an example embodiment, the method may further include determining whether the antenna is steered based on the radiation angle, detecting a reception signal from the other electronic device in response to determining that the antenna is steered based on the radiation angle, and determining whether the reception signal satisfies a threshold value.

According to an example embodiment, the method may further include determining whether the antenna is steered based on the radiation angle, and transmitting a steering command again so as to control the antenna based on the radiation angle in response to determining that the antenna is not steered based on the radiation angle.

According to an example embodiment, the method may further include determining a threshold value again based on the location information in response to determining that the reception signal does not satisfy the threshold value.

According to an example embodiment, the reception signal may be the sensitivity or throughput of a signal received from the other electronic device.

According to an example embodiment, the method may further include obtaining the location information of the other electronic device in response to determining that the reception signal satisfies the threshold value.

According to an example embodiment, the location information may include information associated with the distribution of at least one other electronic device, wherein the distribution of the at least one other electronic device may include information associated with a density of the at least one other electronic device and a distance between the at least one other electronic device.

According to an example embodiment, the method may further include receiving a physical signal, and determining, based on the physical signal, whether the antenna is steered based on the radiation angle.

It should be appreciated that various embodiments of the disclosure and the terms used therein are not intended to limit the technological features set forth herein to particular embodiments and include various changes, equivalents, or alternatives for a corresponding embodiment. With regard to the description of the drawings, similar reference numerals may be used to designate similar or relevant elements. A singular form of a noun corresponding to an item may include one or more of the items, unless the relevant context clearly indicates otherwise. As used herein, each of such phrases as "A or B," "at least one of A and B," "at least one of A or B," "A, B, or C," "at least one of A, B, and C," and "at least one of A, B, or C" may include all possible combinations of the items enumerated together in a corresponding one of the phrases. As used herein, such terms as "a first", "a second", "the first", and "the second" may be used to simply distinguish a corresponding element from another, and do not limit the elements in other aspect (e.g., importance or order). It is to be understood that if an element (e.g., a first element) is referred to, with or without the term "operatively" or "communicatively", as "coupled with/to" or "connected with/to" another element (e.g., a second element), the element may be coupled/connected with/to the other element directly (e.g., wiredly), wirelessly, or via a third element.

As used herein, the term "module" may include a unit implemented in hardware, software, or firmware, or any combination thereof, and may be interchangeably used with other terms, for example, "logic," "logic block," "component," or "circuit". The "module" may be a minimum unit of a single integrated component adapted to perform one or more functions, or a part thereof. For example, according to an embodiment, the "module" may be implemented in the form of an application-specific integrated circuit (ASIC).

Various embodiments as set forth herein may be implemented as software (e.g., the program 140) including one or more instructions that are stored in a storage medium (e.g., the internal memory 136 or external memory 138) that is readable by a machine (e.g., the electronic device 101). For example, a processor (e.g., the processor 120) of the machine (e.g., the electronic device 101) may invoke at least one of the one or more stored instructions from the storage medium, and execute it. This allows the machine to be operated to perform at least one function according to the at least one instruction invoked. The one or more instructions may include a code generated by a compiler or a code executable by an interpreter. The machine-readable storage medium may be provided in the form of a non-transitory storage medium, where the term "non-transitory" refers o the storage medium being a tangible device, and not including a signal (e.g., an electromagnetic wave), but this term does not differentiate between data being semi-permanently stored in the storage medium and the data being temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each element (e.g., a module or a program) of the above-described elements may include a single entity or multiple entities. According to various embodiments, one or more of the above-described elements may be omitted, or one or more other elements may be added. Alternatively or additionally, a plurality of elements (e.g., modules or programs) may be integrated into a single element. In such a case, according to various embodiments, the integrated element may still perform one or more functions of each of the plurality of elements in the same or similar manner as they are performed by a corresponding one of the plurality of elements before the integration. According to various embodiments, operations performed by the module, the program, or another element may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those of ordinary skill in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device for controlling an antenna of a base station in a wireless communication system, the electronic device comprising:
   a communication unit including a transceiver;
   memory storing instructions; and
   at least one processor,
   wherein the memory stores instructions that, when executed by the at least one processor individually or collectively, cause the electronic device to:
      obtain location information of a plurality of other electronic devices;
      determine a threshold value which indicates a direction of an antenna to be configured and is related to reception of signals from the plurality of other electronic devices in a location corresponding to the obtained location information;
      determine intensity of the signals received from the plurality of other electronic devices;
      determine a radiation angle of the antenna that corresponds to the threshold value, based on the determined intensity of the signals;
      adjust the radiation angle of the antenna via electric tilt control based on the determined radiation angle of the antenna;
      analyze a reception sensitivity of the antenna having the radiation angle adjusted by the electric tilt control;
      maintain the adjusted radiation angle if the analyzed reception sensitivity is greater than or equal to a reference value;
      re-adjust the radiation angle of the antenna via mechanical tilt control if the analyzed reception sensitivity is less than the reference value, wherein the mechanical tilt control comprises transmitting a steering command to a tilt device associated with the base station for controlling the antenna;
      determine whether the antenna is steered based on the radiation angle of the antenna; and
      detect reception signals from the plurality of other electronic devices in response to determining that the antenna is steered based on the radiation angle of the antenna.

2. The electronic device of claim 1, wherein the memory stores instructions that, when executed by the at least one processor individually or collectively, cause the electronic device to determine whether the determined intensity is greater than or equal to the reference value.

3. The electronic device of claim 1, wherein the memory stores instructions that, when executed by the at least one processor individually or collectively, cause the electronic device to transmit a steering command again so as to control the antenna based on the radiation angle of the antenna in response to determining that the antenna is not steered based on the radiation angle of the antenna.

4. The electronic device of claim 1, wherein the memory stores instructions that, when executed by the at least one processor individually or collectively, cause the electronic device to, in response to determining that the determined intensity is lower than the reference value, determine a threshold value again based on the obtained location information.

5. The electronic device of claim 1, wherein the memory stores instructions that, when executed by the at least one processor individually or collectively, cause the electronic device to, in response to determining that the determined intensity is greater than or equal to the reference value, obtain location information of the plurality of other electronic devices again.

6. The electronic device of claim 1, wherein the obtained location information comprises information associated with a distribution of the plurality of other electronic devices, and the distribution of the plurality of other electronic devices comprises information associated with a density of the plurality of other electronic devices and a distance between the plurality of other electronic devices.

7. The electronic device of claim 1, wherein the memory stores instructions that, when executed by the at least one processor individually or collectively, cause the electronic device to:
   receive a physical signal; and
   determine, based on the physical signal, whether the antenna is steered based on the radiation angle.

8. An operation method of an electronic device for controlling an antenna of a base station in a wireless communication system, the method comprising:
   obtaining location information of a plurality of other electronic devices;
   determining a threshold value which indicates a direction of an antenna to be configured and is related to reception of signals from the plurality of other electronic devices in a location corresponding to the obtained location information;
   determining intensity of the signals received from the plurality of other electronic devices;

determining a radiation angle of the antenna that corresponds to the threshold value, based on the determined intensity of the signals;

adjusting the radiation angle of the antenna via electric tilt control based on the determined radiation angle of the antenna;

analyzing a reception sensitivity of the antenna having the radiation angle adjusted by the electric tilt control;

maintaining the adjusted radiation angle if the analyzed reception sensitivity is greater than or equal to a reference value;

re-adjusting the radiation angle of the antenna via mechanical tilt control if the analyzed reception sensitivity is less than the reference value, wherein the mechanical tilt control comprises transmitting a steering command to a tilt device associated with the base station so as to control the antenna;

determining whether the antenna is steered based on the radiation angle of the antenna; and detecting reception signals from the plurality of other electronic devices in response to determining that the antenna is steered based on the radiation angle of the antenna.

9. The method of claim 8, further comprising determining whether the determined intensity of reception of the reception signals is greater than or equal to the reference value.

10. The method of claim 8, further comprising transmitting a steering command again so as to control the antenna based on the radiation angle of the antenna in response to determining that the antenna is not steered based on the radiation angle of the antenna.

11. The method of claim 8, further comprising, in response to determining that the determined intensity of reception of the reception signals is lower than the reference value, determining a threshold value again based on the obtained location information.

12. The method of claim 8, further comprising obtaining location information of the plurality of other electronic devices in response to determining that the determined intensity of reception of the reception signals is greater than or equal to the reference value.

13. The method of claim 8, wherein the obtained location information comprises information associated with a distribution of the plurality of other electronic devices, and
the distribution of the plurality of other electronic devices comprises information associated with a density of the plurality of other electronic devices and a distance between the plurality of other electronic devices.

14. The method of claim 8, further comprising:
receiving a physical signal; and
determining, based on the physical signal, whether the antenna is steered based on the radiation angle.

* * * * *